United States Patent [19]

Bregman et al.

[11] Patent Number: 5,530,472
[45] Date of Patent: Jun. 25, 1996

[54] VIDEO CONFERENCE SYSTEM INCLUDING A NON-RESERVED VIDEO CONFERENCE CAPABILITY

[75] Inventors: Susan P. Bregman; Sandra S. Greenstein, both of Atlanta; Tina E. Mayland; John M. McCloskey, both of Roswell; Stephen R. Ratzel, Marietta, all of Ga.

[73] Assignee: Sprint Communications Company L.P., Kansas City, Mo.

[21] Appl. No.: 84,390

[22] Filed: Jun. 29, 1993

[51] Int. Cl.⁶ .............................. H04M 11/00; H04N 7/14
[52] U.S. Cl. .............................. 348/15; 379/94; 379/202; 370/62
[58] Field of Search .............................. 348/15; 379/93, 379/94, 96–97, 202–207; 370/62, 84, 110.1, 85.12, 85.15, 79

[56] References Cited

U.S. PATENT DOCUMENTS

| | | | |
|---|---|---|---|
| 4,475,189 | 10/1984 | Herr et al. | 379/93 |
| 4,635,251 | 1/1987 | Stanley et al. | 379/204 |
| 4,796,293 | 1/1989 | Blinken et al. | 379/204 |
| 4,882,743 | 11/1989 | Mahmond | 348/17 |
| 4,953,159 | 8/1990 | Hayden et al. | 379/94 |
| 5,136,581 | 8/1992 | Muehrcke | 379/202 |
| 5,195,086 | 3/1993 | Baumgartner et al. | 379/202 |
| 5,323,445 | 6/1994 | Nakatsuka | 379/94 |

OTHER PUBLICATIONS

K. Maeno et al, "Distributed Desktop Conferencing System (Mermaid)" IEEE, ICC '91.

*Primary Examiner*—Wing F. Chan
*Attorney, Agent, or Firm*—Harley R. Ball; Michael J. Setter

[57] ABSTRACT

A system for controlling a video-conference network by the end user at a video conference site which is comprised of a public telecommunications network connected to video-conference controllers at the video conference sites. The video-conference controllers allow the end user to issue single commands which initiate an automated sequence resulting in implementation of the end user command. The commands are designed to provide the end user with real time control of video-conferencing.

24 Claims, 7 Drawing Sheets

VIDEO CONFERENCE SYSTEM INCLUDING A NON-RESERVED VIDEO CONFERENCE CAPABILITY

BACKGROUND OF THE INVENTION

1. Field of the Invention

This invention relates generally to telecommunications networks, and more specifically, to video-conference capability on telecommunications networks.

2. Description of the Prior Art

There are obvious benefits to video-conferencing. It replaces time consuming and expensive business travel. When made convenient, it can facilitate interactive face to face communication in situations where no communications would have taken place previously—when travel is too cumbersome, and a phone call is too impersonal. In many situations, a video-conference is the most effective and efficient method to exchange information. Since many businesses have come to depend on the exchange of information for basic operations, it is desirable for them to utilize video-conferencing whenever possible.

Video-conference capability has developed in two primary areas. One is the development of the control and quality of the audio-visual generation and display equipment. The other is the development of network capabilities to connect the audio-visual equipment located in the remote video-conference sites. While these parallel developments have provided video-conference capability, the acceptance of these systems can be enhanced by improving the ease of using these systems in tandem.

Various devices have been developed to control the on-site audio and video equipment. These devices have become user-friendly while the costs for both the equipment and the networks has declined. The end user can now efficiently control the on-site audio and video equipment.

The network configurations that connect the different video-conference sites have also developed an effective capability. Public networks can transmit video and audio information over standard communications media using pulse code modulation. These public networks have the capability to establish effective video and audio communication paths between the different video-conference sites around the world.

Unfortunately, the control of the network has not been provided to the end user in the user-friendly format required to gain wide use of the video-conference throughout the business environment. The end user is the one who makes the decision to use a video-conference, but does not have a simple and convenient way to control the network.

The present network configurations limit the end user's access and control of video-conference capabilities. Private wideband networks are limited because they can only be connected to other conference sites on the private network. Private networks also require great capital expense to install and maintain, as well as individualized control systems. The more accessible public networks require cumbersome set-up procedures that do not allow convenient access to video-conference capability. Public networks do not provide user-friendly control of the video-conference once it has been established.

There is available from at least one source, a microcomputer based product that provides some control of a public video-conference network from a remote location. The product does not provide the end user with full video-conference capability based in the simplest format. The product allows a person familiar with the software to connect to the network database and search for video-conference information. It also allows a person familiar with the software to make reservations for a video-conference.

Unfortunately, the product does not provide the end user with efficient access and full control of the video-conference network. In this system, video-conferencing is driven by reservations only. Impromptu conferences must still be reserved in order to start a conference. For example, if a reserved conference is ready to start thirty minutes early, a new reservation must be made. The end user must specify conference start time and length, and may not just naturally start and stop a conference as if it were a phone call. When the estimated conference time has expired, a new reservation must be obtained to restart the conference. Additionally, if the conference has ended before the total reserved time has expired, the user has no convenient way of ending the conference and may be incurring video-conferencing charges.

The product further requires that all users would have to become trained on the software. An untrained end user does not have direct access to video-conferencing. The product also requires either that a microcomputer be dedicated to video-conferencing, or that end users share the microcomputer with other applications.

In this scenario, microcomputer capacity is wasted by dedication to video-conferencing. In the alternative, the computer is shared by many applications, and this lack of dedication may cause conflicts. Additionally, some end users may not choose to become literate with the software and will need to obtain help in order to access video-conference capability. Inevitably, this system can become a service run by a receptionist (i.e. airline reservations), and not a system that facilitates real time control and use of the video-conference network by the end user.

The result is that while the technology to provide video-conference capability exists, it is not being deployed as fully as anticipated due to problematic end user control. The proper system should allow video communication that is as convenient to use as placing a phone call. Thus, the beneficial resource of the video-conference will continue to remain substantially untapped until the capability is given to the end user in an acceptable format. Therefore, it would be desirable to have a system which provides the end user with an ease of access and control of a video-conference network.

SUMMARY OF THE INVENTION

The problem which prevents the widespread deployment and use of the video-conference is the difficulty and inconvenience that those who decide to use a video-conference, the end users, have in accessing and controlling the video-conference network. The solution is provided by this invention which provides a comprehensive environment in which the end user can have full automated access to video-conference capability using a simple one command format.

This is achieved by the present invention with a video-conference controller that allows an end user at a video-conference site to control a public video-conference network. The video-conference controller prompts the end user to input information to a processor, and the end user inputs information in response to the prompts. The end user can request that a video-conference start. The video-conference system then determines if the requested video-conference is reserved or non-reserved, and initiates either the reserved video-conference, or the non-reserved video-conference based on response from end user. The non-reserved conference is initiated by prompting a phone number from the end user and acting on the input. The system allows the user to extend or stop existing video-conferences in real time.

The present invention also allows control through a video-conference system. The system has the following components: a computer, a database, a help desk workstation, two communications servers, and a LAN that connects these components. The system also includes video-conference controllers located in remote video-conference sites which are connected over telecommunications lines to one communications server. The system also includes a digital cross-connect system connected to video-conference equipment located at the video-conference sites, and to the other communications server. The computer controls the digital cross-connect system which establishes video-conference connections between video-conference sites. The control is based on requests from the video-conference controllers that are not in conflict with any other reserved video-conferences.

BRIEF DESCRIPTION OF THE DRAWINGS

These and other features and advantages of the present invention will become better understood with the following description, claims and drawings where:

DETAILED DESCRIPTION

Figure 1:
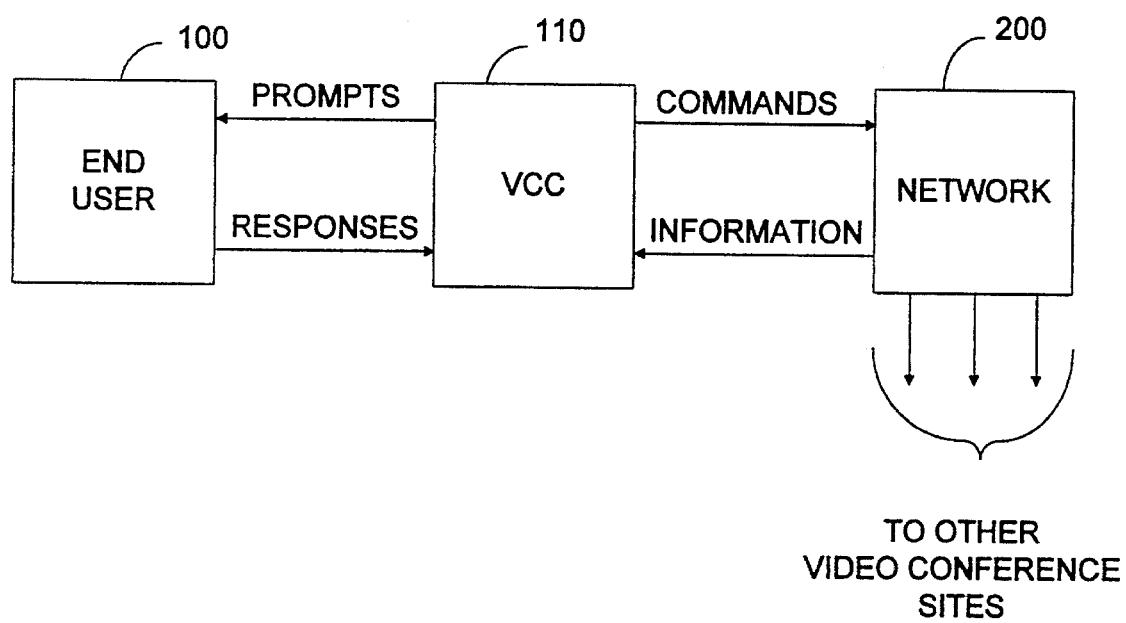
FIG. 1 is a block diagram of the video-conference system.

Referring to FIG. 1, End User 100 is provided with control over Video-conference Network (Network) 200 by a system that places single command capability in the hands of End User 100. This control is initiated by Video-conference Controller (VCC) 110. VCC 110 is the interface between End User 100 and Network 200. End User 100 communicates with VCC 110 through prompts and responses. VCC 110 commands Network 200 to reserve and establish communication paths between different video-conference sites as requested by End User 100.

VCC 110 is located at the video-conference site. This dedicated controller provides End User 100 with full video-conference capability in a format that requires no special training or experience. VCC 110 has several functions designed to give End User 100 single command control capability. The single commands are: start meeting, stop meeting, reservations, search, and help. After one of the above commands is given to VCC 110 by End User 100, an automated sequence is initiated that results in implementation of the command from End User 100.

VCC 110 also allows information to flow from Network 200 to End User 100. In a preferred embodiment, it does this in part by accepting regular downloads of information from Network 200. It also provides End User 100 with important video-conference information during a video-conference that provides End User 100 with real time options as to video-conference extensions and Network 200 control.

Network 200 is a public network that has the capability to provide video and audio communication paths between different video-conference sites. Network 200 accepts and executes the End User 100 commands provided by VCC 110. In this way, End User 100 may be untrained, yet have full control over Network 200 by using single commands. Network 200 has several functions designed to implement End User 100 commands that are given through VCC 110.

Figure 2:
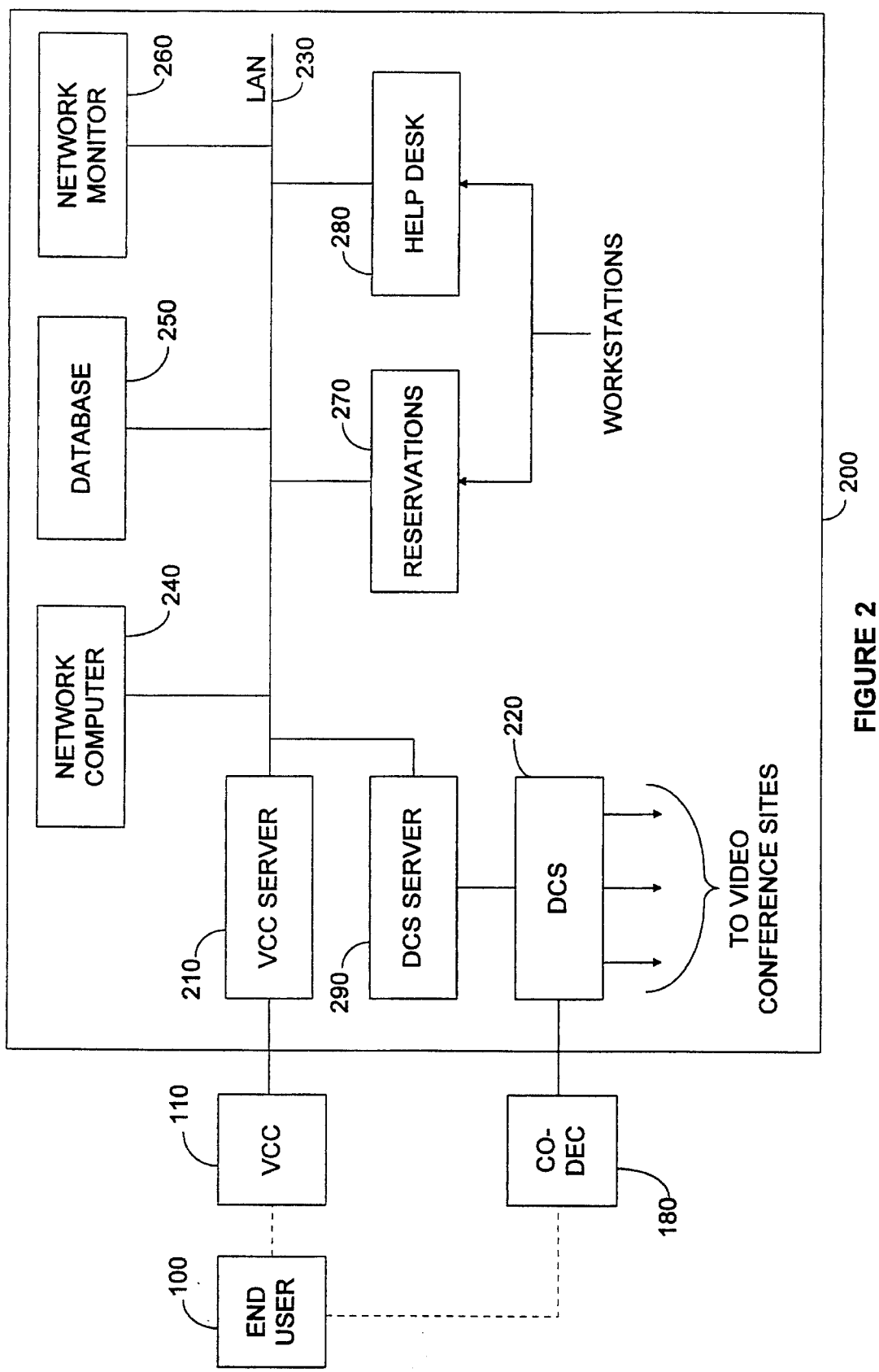
FIG. 2 is a detailed block diagram of the video-conference system.

Referring to FIG. 2, Network 200 is made up of several components. The equipment of the preferred embodiment is given after the hyphen in capitals. The components are: VCC Server 210—HEWLETT PACKARD (HP) 9000 MODEL 827, Digital Cross-connect System (DCS) 220—TELLABS MODEL 532, Local Area Network (LAN) 230—ETHERNET, Network Computer 240—HP 9000 MODEL 720, Database 250—HP REAL TIME APPLICATION PLATFORM and SYBASE SQL SERVER, Network Monitor 260—HP 9000 MODEL 720, Reservations Workstation 270—INTEL 386 BASED PERSONAL COMPUTER, Help Desk Workstation 280—HP 9000 MODEL 720, and DCS Server 290—HP 9000 MODEL 720 and HP 2345A DATA TERMINAL CONTROLLER. Help Desk Workstation 280 also includes generic modems, cameras, monitors, an audio system, video codecs, a video router, data test set equipment, a pink noise generator, and an audio meter.

VCC Server 210 allows the exchange of information between VCC 110 and components on LAN 230, especially Network Computer 240. Another communications server, DCS Server 290, allows communication between components on LAN 230 and DCS 220. DCS 220 provides the video and audio communications paths between the various video-conference sites. DCS 290 monitors DCS 220 alarms and transmits them to Database 250. LAN 230 allows Network Computer 240 to communicate with its supporting components in order to implement the commands it receives from VCC 110. Network Computer 240 can store and retrieve information from Database 250 which contains video-conference information. Network Monitor 260 displays the DCS 220 alarms that appear in Database 250. Reservation Workstation 270 and Help Desk Workstation 280 provide staff support to End User 100 if a pre-determined condition is detected on Network 200, at VCC 110, or if requested by End User 100.

The switching of Network 200 is provided by DCS 220 which is connected to DCS Server 290 over a data link. These systems and connections are readily understood by those skilled in the art. The switches that control flow through DCS 220 are solid state devices that switch digital signals by means of a time division matrix. The switches in the system are connected by intermachine trunks (IMTs) which function as pulse code modulated T1 communication lines operating with 24 channel, 1,544 Mbit/second capability. Typically, the Interexchange Carrier (IXC) point of presence (POP) delivers the T1 lines to the Local Exchange Carrier (LEC) for connection to Codec 180 at the customer site.

Codec 180 can be a generic video codec and is used at the video-conference site to interface between the audio and video equipment and Network 200. Codec 180 compresses and digitizes analog signals for transmission over a digital network. DCS 220 connects the codecs at the different video-conference sites and provides both switching and a transmission medium for the signals.

VCC Server 210, DCS Server 290, and LAN 230 provide communication paths between the various components of Network 200. Network Computer 240 is connected to LAN 230 and it performs various functions including control of DCS 220 and coordination of the support features of Network 200. Network Computer 240 accepts user requests (i.e. for a video-conference or reservation) and implements them within the digital cross-connect system. Network Computer 240 employs Database 250 which is also connected to the LAN 230, and downloads information to VCC 110 at regular intervals. The information can then be used by End User 100 without a connection with Network 200. Database 250 stores the following information: customer site descriptions, customer premise equipment, DCS port assignments, network configurations, and video-conference reservation information. Those skilled in the art will appreciate other useful information which could be stored.

Network Monitor 260 is connected to LAN 230 and offers continuous support to Network 200 by displaying DCS 220 alarms that appear in Database 250. Database 250 receives these alarms from DCS Server 290 which continually monitors DCS 220 performance. The function of Network Monitor 260 is to acknowledge any DCS 220 alarms, IMT failures, and equipment failures. DCS Server 290 can isolate faults and manage Network 200 configuration.

Reservations Workstation 270 is connected to LAN 230 and allows an operator to provide End User 100 with staff support should it be requested. End User 100 may access an operator at Reservations Workstation 270 by a separate telephone line, or by pressing the "help" key on VCC 110 before a conference has become active. The operator may access information from Database 250, especially reservation and billing information, and direct Network Computer 240 to make and cancel reservations. The operator can also set up simple conferences if required, due to any malfunction of VCC 110.

An advantageous support feature of the video-conference system is Help Desk Workstation 280 which provides staff support to End User 100 upon the occurrence of numerous conditions. These conditions can be continuously updated and defined, but they include signals from End User 100, VCC 110, Network Monitor 260, VCC Server 210, DCS Server 290, or Network Computer 240. In the preferred embodiment, these conditions are: breakdowns in transmission between VCC 110 and Network 200, End User 100 requests, and negative End User 100 responses to start meeting and meeting quality prompts.

Network Computer 240 compiles end user information and sends it to Help Desk Workstation 280 after detection of a help condition. The operator at Help Desk Workstation 280 will promptly contact the affected conference site by separate telephone line and direct Network Computer 240 to remedy the problem. In the preferred embodiment, the information compiled and sent to Help Desk Workstation 280 is comprised of: the help condition and source of signal, the participating video conference sites and phone numbers, the equipment configuration at the participating video-conference sites, the network configuration connecting the participating video-conference sites, customer database information, and contact names at the participating video-conference sites. Help Desk Workstation 280 has the capability to focus on particular modules of information in an icon and windows format. A case history is started that records all help activity, and billing is automatically suspended. Help Desk Workstation 280 provides access to network control devices which can eliminate conditions which prompted the help request.

Figure 3:
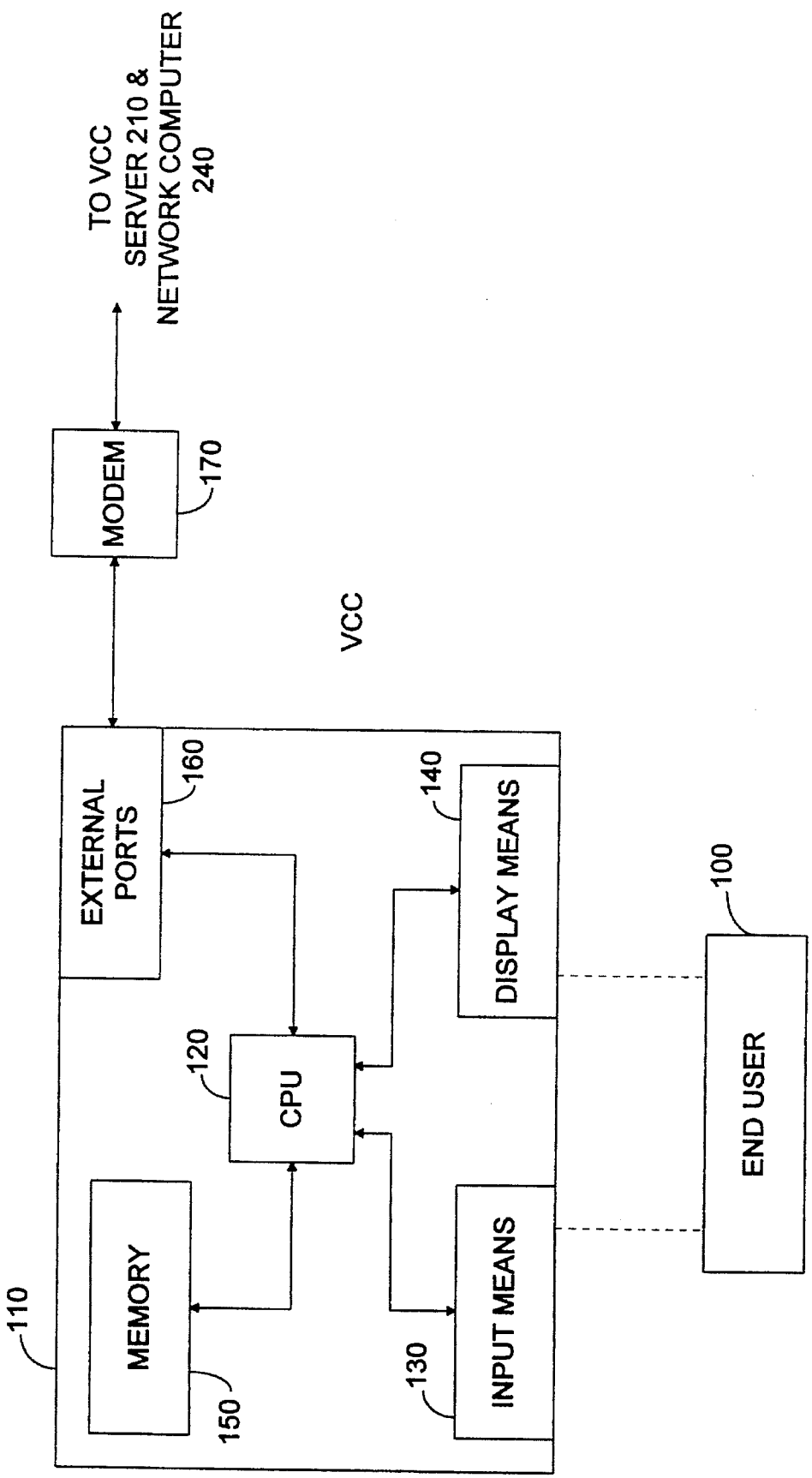
FIG. 3 is a block diagram of a video-conference controller.

Referring to FIG. 3, VCC 110 is the interface between End User 100 and Network 200. In the preferred embodiment, it is a VERIFONE PINSTRIPE 3 POINT OF SALE. Likewise, it could be a software module that is provided for deployment on a personal computer. VCC 110 is based on CPU 120 that employs numerous components to accomplish its function of interfacing between End User 100 and Network 200. CPU 120 accesses a memory, drives a display, accepts inputs, and interfaces with Network 200.

End User 100 may input commands and other information to CPU 120 through Input Means 130. Input Means 130 is designed to give End User 100 single command capability. After the single command is given (i.e. "start meeting"), VCC 110 prompts End User 100 through the few simple inputs (i.e. a phone number) which are required to accomplish the user request. In the preferred embodiment, Input Means 130 includes a numeric keypad, command keys, soft keys, and a magnetic strip reader. Command keys are hard keys which are defined by the specific function they initiate, and they remain constant, i.e. "Start Meeting". Soft keys are defined by the display and may change, i.e. "No", or "Confirm". Likewise, other input means could be used such as a microcomputer keyboard, or a voice recognition unit. End User 100 is able to receive information from CPU 120 through Display Means 140 which may include a video display and audio signal. Other options, such as printers and voice generation units could also be employed. CPU 120 is connected to Memory 150 which stores regular downloads of information from Network 200. VCC 110 is equipped with External Ports 160 that allow connection with external system components. External Ports 160 may include standard ports for CPU 120 connection to the modems and codecs which ultimately link up with Network 200.

VCC 110 is connected to Modem 170. Modem 170 is connected to Network 200 through standard communications media. Typically, this would be a switched public network provided by a LEC, although one skilled in the art will recognize other means to communicate between VCC 110 and Network 200, such as dedicated access lines and wideband communications networks. Typically, the LEC connects to an IXC node. The IXC node is connected to VCC Server 210 of Network 200 on an X.25 packet switched network. Those skilled in the art are familiar with these connections, as well as various types of other communications media which could be used for this purpose.

Figure 4:
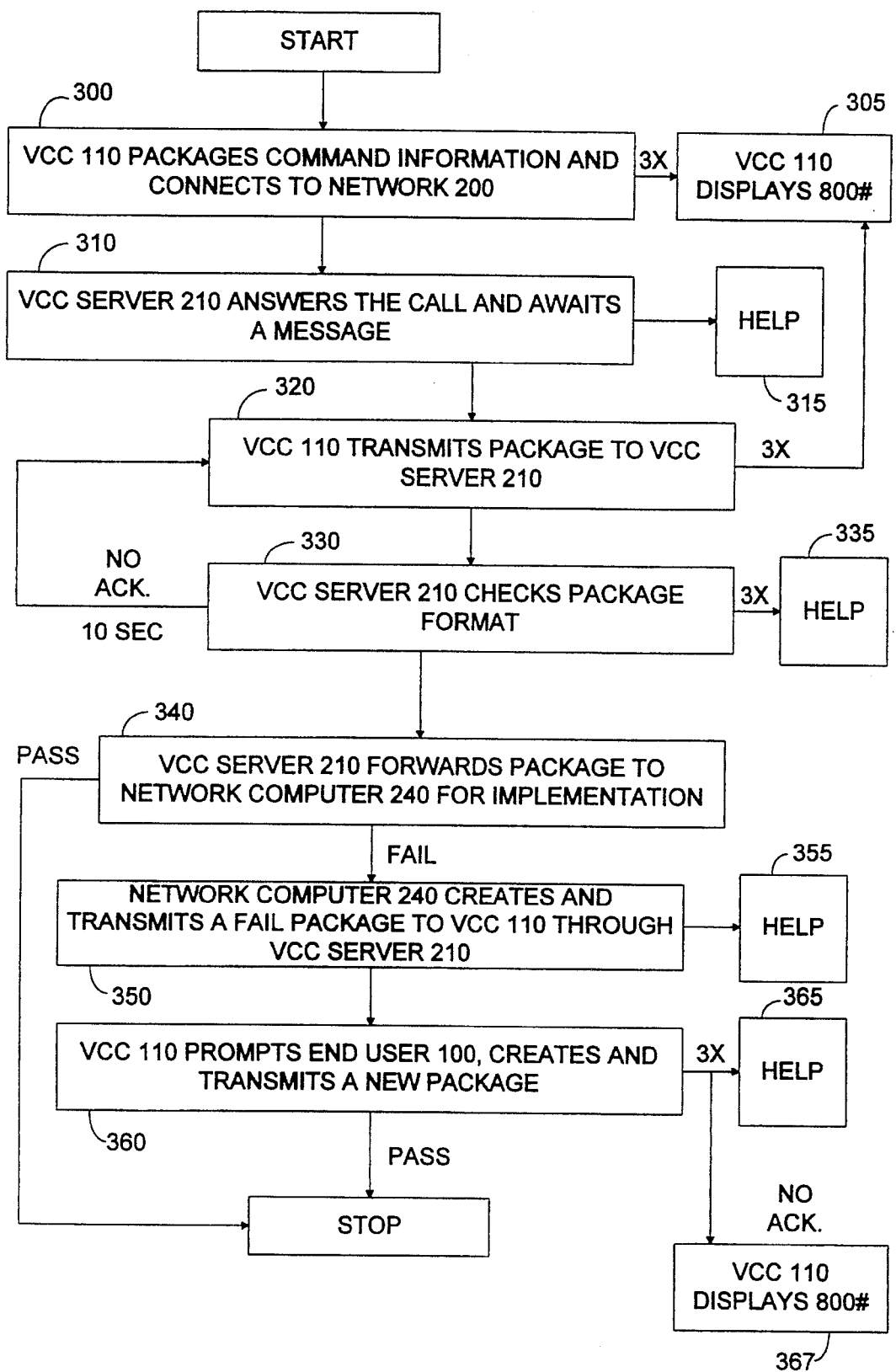
FIG. 4 is a flow diagram of a video-conference controller to video-conference network communication sequence.

Referring to FIG. 4, communications between VCC 110 and Network 200 occur as follows. When CPU 120 in VCC 110 has reached the proper point in a command sequence to contact VCC Server 210, it packages the command information in a preset format and generates a checksum at 300. The package includes the command code, the originating number, the authorization/billing codes (if used), the destination number, the checksum, and a new line character. VCC 110 then connects to Network Computer 240 through the communications path described above—Modem 170 to VCC Server 210 (by LEC and an X.25 line), and to LAN 230. If that path is unavailable, VCC 110 dials an 800 number to connect to Network 200. VCC 110 attempts three times to make the connection. If unsuccessful, VCC 110 displays "Please call 1-800-xxx-xxxx" at 305.

VCC Server 210 answers the call from VCC 110 and receives an ENQ signal from VCC 110 at 310. VCC Server 210 waits 30 seconds to receive a message. After 30 seconds, VCC Server 210 will either generate a help signal at 315, revert to the idle mode, or attempt to re-transmit. The action depends on the conditions of the failure.

VCC 110 sends the command package to VCC Server 210 and starts a 180 second count at 320. When VCC Server 210 receives the package, it verifies accuracy of the checksum and checks for a new line character at 330. If VCC Server 210 is unable to verify, it sends a no acknowledge signal to VCC 110 and VCC 110 attempts to re-transmit at 320. After three attempts, a help signal is generated at 335. After a combination of three no acknowledge signals or a 15 second delay, VCC 110 displays "please call 1-800-xxx-xxxx" to End User 100 at 305. If the checksum and new line character are correct, VCC Server 210 sends a second acknowledge signal to VCC 110 and receives one in return.

After verification, VCC Server 210 forwards the VCC 110 command package to Network Computer 240 at 340, but replaces the checksum with an X.25 or serial port address. Network Computer 240 checks the user command against information in the database, and implements the command if possible at 340. Network Computer 240 sends either a pass or fail package to VCC Server 210. A fail package contains a code indicating the type of failure at 350. VCC Server 210 generates a checksum, transmits the package to VCC 110, and starts a time counter (one to five minutes, depending on the package). VCC Server 210 sends a help signal to Network Computer 240 if there is no response within the specified time at 355.

VCC 110 transmits an acknowledge signal when it receives the package, unless the checksum is incorrect then a no acknowledge signal is sent. It prompts End User 100 to re-enter any inputs that failed, and sends a new package to Network 200 at 360. After three unsuccessful attempts at package transmission, VCC 110 sends a help signal to Network 200 at 365. If the help command is not acknowledged by Network 200, VCC 110 displays "please call 1-800-xxx-xxxx" at 367. After two minutes without end user re-entry, VCC 110 goes to the idle mode. After a pass signal is received, VCC 110 proceeds to the next step in the command sequence. As one skilled in the art can recognize, VCC Server 210 can contact a destination VCC using a similar process.

The advantages of this video-conference system can be appreciated as follows. The end user is given full control of video-conference capability by using a few simple commands. The single command format requires no training or administrative personnel to operate. In one embodiment, the VCC is a dedicated device which eliminates conflicts over demands for use of a microcomputer for other purposes.

The VCC provides the end user with real time control during a video-conference and allows the end user to start, extend, or stop a video-conference by answering prompts. The end user is not restricted to a reservations-only format and may approach video-conferencing like making a phone call. This is because the end user has the flexibility to start and stop a conference naturally without being forced to adhere to a pre-determined schedule. The VCC receives regular downloads of video-conference information, so the end user does not need to connect to the network to review video-conference information, such as reservation schedules.

The video-conference system is equipped with a help capability that identifies problems and initiates communication from network personnel to the problem area. These personnel are automatically given relevant information at their workstation that is specific to the given problem and have the power to remedy that problem. The end user has only a passive role in this process, although the end user may request help at any time. Aside from the on-line help feature, the video conference system has a network monitor that keeps the network under constant surveillance, and identifies and remedies problems before they affect the end user.

The full control coupled with the ease of use provided by the present invention can make video-conferencing an attractive alternative to other forms of communication. This is especially advantageous when video-conferencing is the most effective and efficient form of communication.

The operation of the video-conference system is best described by detailing its best mode. This envisions the system described above being implemented. This would include Network 200 connected to various video-conference sites including that of End User 100. These sites would have VCCs to allow end user interface with Network 200. Prior to use, the system would be in an idle mode. VCC 110 would display a message that indicates it is ready to accept a command. During the idle period, VCC 110 also accepts regular downloads of information from Network 200. This information would include an updated video-conference reservation schedule for the particular conference site, and an updated list of available distant conference site phone numbers.

End User 100 has five command options that are initiated by pressing the corresponding hard key on VCC 110. These five keys are: start meeting, stop meeting, reservations, search, and help. Typically, End User 100 may begin by searching VCC 110 memory for relevant information. By pressing the "search" key, End User 100 is prompted on the display by CPU 120 to pick either the conference site schedule, or a distant conference site directory. End User 100 does this by pressing a soft key. The chosen database is retrieved from memory, and End User 100 can scroll through the database on the display using the soft keys. These databases are regularly updated by Network Computer 240. In the preferred embodiment, these databases are schedules of video conferences for that site, and a directory of other video conference sites and phone numbers. End User 100 presses a soft key to exit the search sequence.

Figure 5:
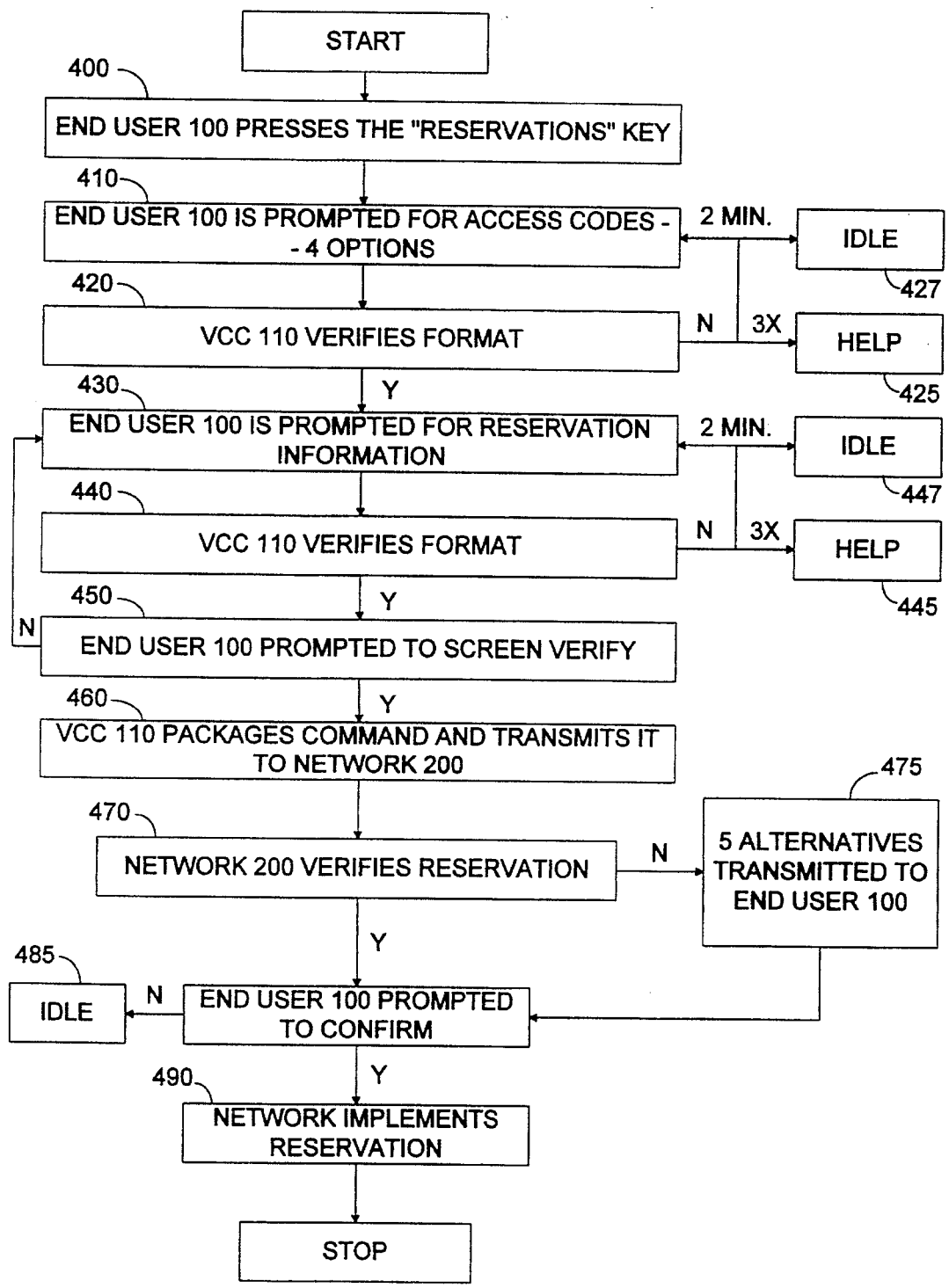
FIG. 5 is a flow diagram of a reservations sequence.

Referring to FIG. 5, End User 100 can initiate a reservation sequence by pressing the "reservations" key at 400. CPU 120 response at 410 is dictated by one of four pre-set options designed to allow End User 100 to decide on a level of restricted access. The first option offers no security and provides End User 100 with immediate reservation capability at 430.

In the second option, CPU 120 prompts the user to enter an authorization number which is input using the keypad. The input format is the correct number of numerical digits. VCC 110 verifies that the input format is correct at 420 before providing End User 100 with reservation capability at 430. Network 200 verifies the validity of the authorization number before allowing any network video-conferencing activity at 470.

The third option adds a step to the second option by prompting End User 100 to swipe a card with a magnetic strip containing an account number, such as the FONCARD from SPRINT, through the magnetic strip reader on VCC 110 at 410. VCC 110 verifies the input format of the account number before allowing any network video-conferencing activity at 420.

The fourth option also adds a step to the second option by prompting End User 100 to input a cost number to be used for billing purposes at 410. VCC 110 verifies the input format of the cost number before allowing any network video-conferencing activity at 470.

After access to reservation capability is achieved, CPU 120 prompts End User 100 to enter a distant phone number, a date, a start time, and an elapsed time with the key pad and soft keys at 430. CPU 120 checks the inputs for the correct input format at 440, then displays the inputs on the display and prompts End User 100 to verify by pressing a soft key at 450.

If the input format of the access information or reservation information is in incorrect, CPU 120 re-prompts End User 100 to re-input at 410 and 430. After three unsuccessful attempts, CPU 120 transmits a help signal to Network 200 at 425 and 445. Staff at Reservations Workstation 270 are prompted to contact the video-conference room by separate phone line. If any prompt remains unanswered for two minutes, CPU 120 reverts to the idle mode at 427 and 447.

After End User 100 display verification of the reservation request, CPU 120 packages the information and sends it to Network 200 for verification at 460. VCC Server 210 forwards the package to Network Computer 240 after an error check at 470. If the reservation is unavailable, Network Computer 240 sends VCC 110 the next five available reservation times that most closely correspond with the requested parameters, and they are displayed to End User 100 at 475. End User 100 can pick one of these five times with a soft key at 480.

If the reservation is available, Network Computer 240 sends VCC 110 the reservation information, and End User 100 is prompted to verify the reservation by pressing a soft key at 480. If End User 100 chooses no, VCC 110 instructs Network 200 accordingly and reverts to the idle mode at 485. If End User 100 chooses yes, VCC 110 sends the confirmation to Network 200 and receives a confirmation number from Network 200 to display to End User 100 before reverting to the idle mode. Network Computer 240 then updates Database 250 with the new reservation at 490.

End User 100 can initiate a reserved video-conference by pressing the "start meeting" key. CPU 120 in VCC 110 determines from information in memory if the command is five minutes prior to, or 15 minutes after, a reserved conference start time. If so, it enters a reserved conference start sequence. If not, it enters an on-demand (non-reserved) conference start sequence.

The reserved conference start sequence begins by CPU 120 prompting End User 100 to verify with a soft key that a reserved conference is to start. If End User 100 responds with a no, a help signal is sent to Network 200. If End User 100 responds with a yes, VCC 110 contacts Network 200 and commands a conference start. Network 200 establishes a connection between the reserved video-conference sites on DCS 220 in response to the command. The command from VCC 110 is transmitted to VCC Server 210 and forwarded to Network Computer 240 where it is processed and sent to DCS Server 290 for transmission to DCS 220.

Figure 6:
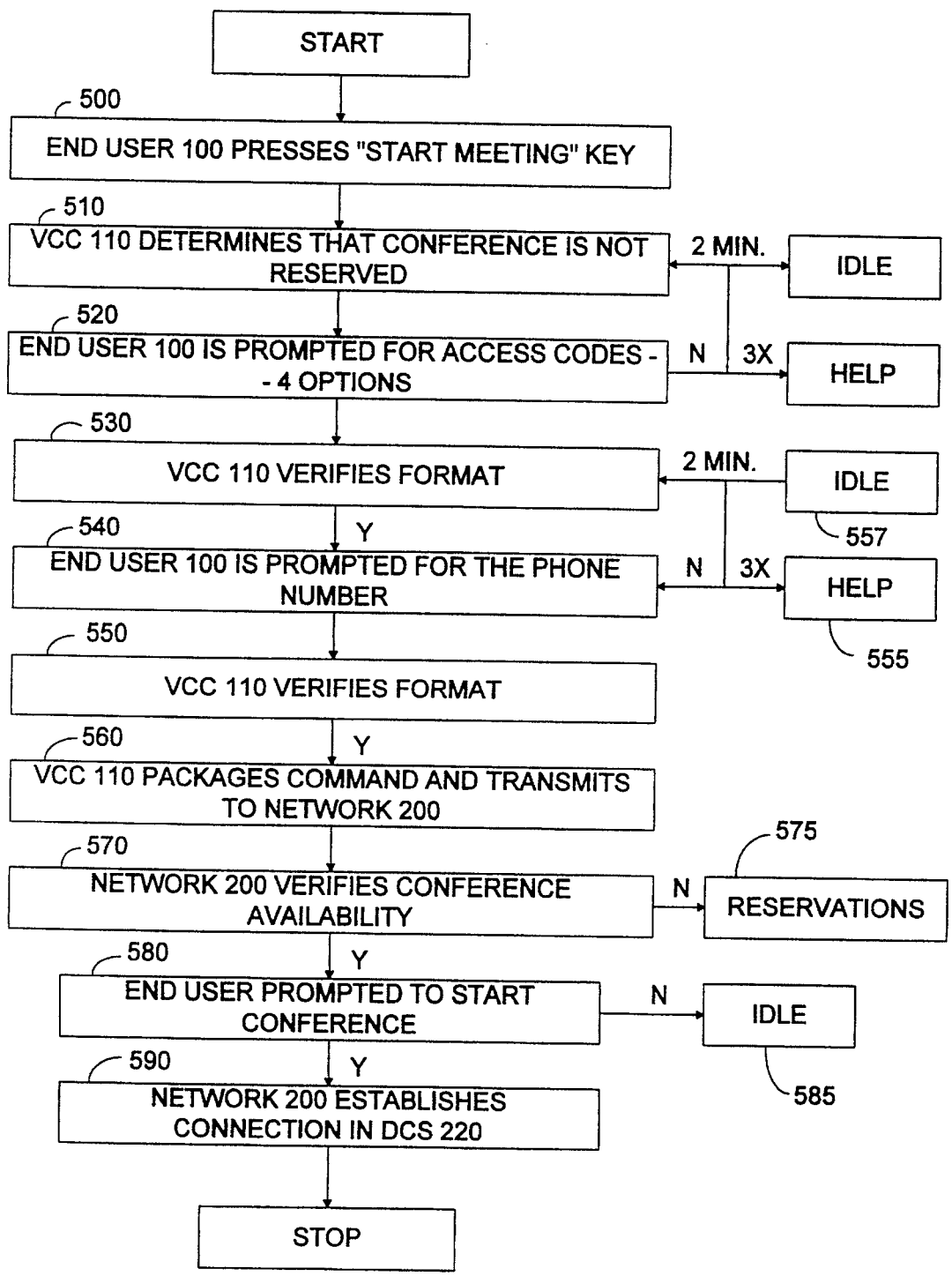
FIG. 6 is a flow diagram of an on-demand video-conference sequence.

Referring to FIG. 6, End User 100 can initiate an on-demand (non-reserved) video-conference by pressing the "start meeting" key at 500. CPU 120 in VCC 110 determines from information in memory if the command is five minutes prior to, or 15 minutes after, a reserved conference start time at 510. If so, it enters a reserved conference start sequence. If not, it enters an on-demand (non-reserved) conference start sequence at 520.

The on-demand conference start sequence begins with four access options at 520 & 530 which are the same as those described in the reservation sequence above. Once access has been achieved, End User 100 is prompted to enter a distant phone number at 540 which is checked for proper input format by VCC 110 at 550. After three unsuccessful attempts at input, VCC 110 sends a help signal to Network 200 at 555. Staff at Reservations Workstation 270 are instructed to contact the video-conference room by separate phone line. If a prompt goes unanswered for two minutes, VCC 110 reverts to the idle mode at 557.

After the proper format is verified, VCC 110 contacts Network 200 and issues a command at 560 using the process described above. Network Computer 240 verifies the distant number and availability with information in Database 250 at 570. If the distant conference site is available, Network 200 instructs VCC 110 of the available length and time of the video-conference, and VCC 110 prompts End User 100 to verify the start conference request with a soft key at 580. After End User 100 selects yes, VCC 110 instructs Network 200 which then establishes a connection between the video-conference sites on DCS 220 for an on-demand conference at 590. The command is transmitted from VCC 110 to VCC Server 210 and forwarded to Network Computer 240 where it is processed. It is then sent to DCS Server 290 for transmission DCS 220. If End User 100 responds no, or if there is no response within two minutes, VCC 110 instructs Network 200 accordingly and reverts to the idle mode at 585.

If the distant conference site is not available, Network Computer 240 transmits the failure to VCC 110 which then prompts End User 100 to initiate a reservation sequence if desired at 575.

Once Network 200 establishes a connection between conference sites, for either a reserved or an on-demand conference, it notifies the involved VCCs that there should be a connection. VCC 110 prompts the originating end user (End User 100) to verify the quality of the video-conference. If End User 100 responds negatively, VCC 110 sends a help command to Network 200 and billing does not begin. If End User 100 responds yes, VCC 110 instructs Network 200 that a conference is in progress and billing should begin.

End User 100 may elect to stop a meeting in progress by pressing the "stop meeting" key. After this occurs, VCC 110 prompts End User 100 to verify the stop request with a soft key. The meeting continues if the response is no. If the response is yes, VCC 110 instructs Network 200 to stop billing, and VCC 110 reverts to the idle mode.

Whenever the "help" key is pressed, VCC 110 automatically sends a help command to Network 200. Reservations Workstation 270 handles help requests not associated with an active video-conference. During an active video-conference, the process goes as follows. The Network Computer 240 compiles relevant help information and provides it to Help Desk Work Station 280. Staff at Help Desk Work Station 280 then contact the affected conference site by a separate phone line to address the problem. The help sequence is also initiated by the recognition of several pre-set help conditions.

These conditions may include: an input failure by the end user, a negative response to a reserved conference start prompt, a negative response or delay to a conference quality prompt, a delay after a "stop meeting" command, and an end user "help" command. One skilled in the art will appreciate other possible help conditions.

Figure 7:
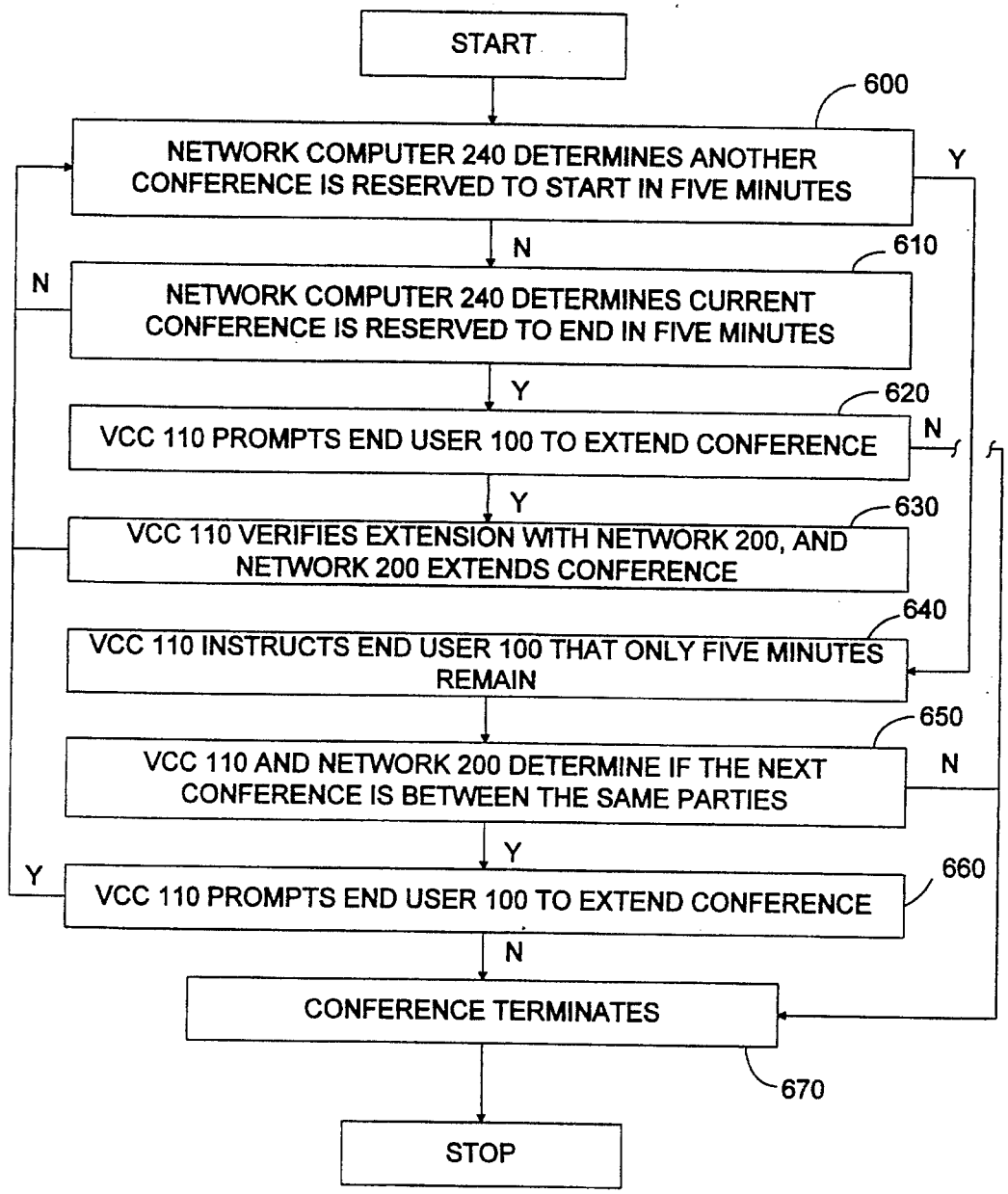
FIG. 7 is a flow diagram of a video-conference in progress sequence.

Referring to FIG. 7, Network Computer 240 continually monitors its Database 250 during a conference in progress for schedule conflicts at 600 & 610. If it determines at 600 that only five minutes remain before another reserved conference is scheduled at any site participating in the video-conference, it sends a message to VCC 110 which issues an audio warning tone and displays that only five minutes remain in the conference at 640. Network Computer 240 and VCC 110 determine if the conference can be extended at 650 as follows. Network Computer 240 checks to see if the next conference is between the same sites. If so, it sends a message to VCC 110 which prompts End User 100 (the originating end user) to request an extension by pressing a soft key. If the response to the extension prompt is no, or if the same sites are not involved, VCC 110 reverts to the idle mode and Network 200 disconnects the conference when the next reserved conference is scheduled to begin at 670. If End User 100 elects to extend the conference at 660, VCC 110 sends an extension request to Network 200. Network Computer 240 instructs the Help Desk Workstation 280 staff to phone the originating conference site and verify that the second reservation was made by the same parties. If so, the next conference is allowed as an extension to the first one at 650.

Reserved conferences have termination times. If there are no conflicts with another reservation, VCC 110 issues an audio warning tone and displays that only five minutes remain in the reserved conference. VCC 110 then prompts End User 100 to request an extension at 620. If End User 100 responds no to the extension prompt, the conference terminates naturally at 670, but if End User 100 responds yes, the conference becomes an on-demand conference and VCC 110 instructs Network 200 accordingly at 630. When there are no conflicts with other reserved conferences, an on-demand conference can continue indefinitely.

What is claimed is:

1. A video-conference controller for allowing a user at a video-conference site to control a public video-conference network to facilitate interactive face to face communications through a video-conference with full-motion video transmitted at a rate of at least 1,544,000 bits per second wherein the video conference controller comprises:

(a) a means for prompting the user to input information to a processor;

(b) a means for allowing the user to input information to the processor;

(c) a means for allowing the user to request a start of the video-conference;

(d) a means for determining if the requested video-conference is non-reserved, actuated by the video-conference user start request;

(e) a means for initiating a reserved video-conference, actuated by the determination that the requested video-conference is reserved;

(f) a means for initiating a non-reserved video-conference by prompting the input of a distant site number and acting on the input, actuated by the determination that the video-conference is non-reserved.

2. The video-conference controller of claim 1 which further comprises:

(a) an alpha-numeric display;

(b) a memory;

(c) a keypad;

(d) an external port for connection to a modem;

(e) a processor connected to the display, the memory, the keypad, and the external port.

3. The video-conference controller of claim 1 which further comprises a means for updating a memory with information received from the video-conference network.

4. The video-conference controller of claim 1 which further comprises a means for searching video-conference information stored in a memory.

5. The video-conference controller of claim 4 wherein the means for searching video-conference information further comprises:

(a) a means for allowing the user to request the search;

(b) a means for prompting the user to input a selection of a database stored in a memory, actuated by the user search request;

(c) a means for allowing the user to input the selection of the database;

(d) a means for allowing the user to scroll through the selected database on a display.

6. The video-conference controller of claim 4 wherein the video-conference information comprises a schedule of video-conferences for the site, and a directory of video-conference sites and phone numbers.

7. The video-conference controller of claim 1 which further comprises a means for reserving video-conferences with the video-conference network.

8. The video-conference controller of claim 7 wherein the means for reserving video-conferences further comprises:

(a) a means for allowing the user to request a reservation;

(b) a means for prompting the user to input video-conference reservation information, actuated by the user reservation request;

(c) a means for allowing the user to input reservation information;

(d) a means for reserving the video-conference requested by the user with the video-conference network, actuated by the user input of reservation information.

9. The video-conference controller of claim 1 which further comprises a means for restricting access to video-conference capability.

10. The video-conference controller of claim 9 wherein the means for restricting access further comprises:

(a) a means for prompting the user to input access information;

(b) a means for allowing the user to input access information;

(c) a means for transmitting the access information to the network for verification against correct access information;

(d) a means for allowing the user to access video-conference capability, actuated by the network verification.

11. The video-conference controller of claim 1 which further comprises a means for extending existing video-conferences in progress through the video-conference network.

12. The video-conference controller of claim 11 wherein the means for extending video-conferences further comprises;

(a) a means for receiving a network determination that the video-conference is nearing termination;

(b) a means for receiving a network determination that no other video-conference is scheduled after the video-conference in progress;

(c) a means for prompting the user to request an extension of the video-conference, actuated by the determination that the video-conference is nearing termination and that no other video-conference is scheduled after the video-conference in progress;

(d) a means for allowing the user to input the request for an extension of the video-conference;

(e) a means for initiating an extension of the video-conference with the video-conference network, actuated by the user extension request.

13. The video-conference controller of claim 1 which further comprises a means for accessing off-line help from the video-conference network.

14. The video-conference controller of claim 13 wherein the means for accessing off-line help further comprises:
(a) a means for detecting a pre-determined help condition;
(b) a means for initiating a phone call from the video-conference network to the conference site, initiated by the detection of the help condition.

15. The video-conference controller of claim 1 which further comprises a means for terminating video-conferences.

16. The video-conference controller of claim 1 which further comprises:
(a) a means for comparing user inputs to correct input formats stored in a memory;
(b) a means for re-prompting the user to correct conflicts between the user inputs and the correct input formats;
(c) a means for allowing the user to re-enter inputs.

17. A video-conference system for allowing users to exchange full-motion video at a rate of at least 1,544,000 bits per second to facilitate interactive face to face communication through video-conferences, wherein the system comprises:
(a) a plurality of video-conference control means located at video-conference sites for prompting and receiving video-conference commands and information from a user;
(b) a means for interfacing with the plurality of video-conference control means;
(c) a means for processing user commands received from the video-conference control means, wherein the commands comprise: start a non-reserved conference, extend an existing conference, and stop an existing conference;
(d) a means for controlling a public telecommunications network connected to the video-conference sites to facilitate a video-conference with full-motion video transmitted at a rate of at least 1,544,000 bits per second, wherein the control is responsive to the commands.

18. The video-conference system of claim 17 which further comprises:
(a) a computer;
(b) a database;
(c) a help desk workstation;
(d) a VCC communications server;
(e) a DCS communications server;
(f) a LAN connecting elements (a)–(e);
(g) a plurality of the video-conference controllers located in remote video-conference sites and connected over telecommunications media to the VCC communications server;
(h) a digital cross-connect system connected to video-conference equipment located at a plurality of video-conference sites, and connected to the DCS communications server.

19. The video-conference system of claim 17 which further comprises:
(a) a means for reserving video-conferences if there are no conflicts with other reserved video-conferences, based on reservation requests from the video-conference control means;
(b) a means for storing video-conference reservation information;
(c) a means for downloading video-conference reservation information to the video-conference control means.

20. The video-conference system of claim 17 which further comprises a means for recognizing a plurality of predetermined help conditions and providing a workstation with information to contact the video-conference site and respond to the condition.

21. The video-conference system of claim 20 wherein the pre-determined help conditions are an inability of the video-conference control means to communicate with the processing and control means, a negative response by the user to a prompt by the video-conference control means to verify conference quality, and a help command by the user to the video-conference control means.

22. The video-conference system of claim 20 wherein the information is the participating video conference sites and phone numbers, the video-conference site equipment configurations, and the network configuration.

23. The video conference system of claim 17 wherein the extension of an existing video-conference further comprises;
(a) a means for determining that the video-conference is nearing termination;
(b) a means for determining that no other video-conference is scheduled after the video-conference in progress;
(c) a means for causing the video-conference control means to prompt the user to request an extension of the video-conference, actuated by the determination that the video-conference is nearing termination and that no other video-conference is scheduled after the video-conference in progress;
(d) a means for allowing the user to input the request for an extension of the video-conference to the video-conference control means;
(e) a means for causing the network to extend the video-conference, actuated by the user extension request.

24. A method of controlling a video-conference network by a user at a video-conference site to facilitate a video-conference with full-motion video transmitted at a rate of at least 1,544,000 bits per second, wherein the method comprises:
(a) allowing a user to request a start of the video-conference;
(b) determining if the requested video-conference is non-reserved, actuated by the video-conference user start request;
(c) initiating a reserved video-conference, actuated by the determination that the requested video-conference is reserved;
(d) initiating a non-reserved video-conference by prompting the input of a distant site number and automatically acting on the input, actuated by the determination that the video-conference is non-reserved.

* * * * *